(12) United States Patent
Gray et al.

(10) Patent No.: US 12,006,922 B1
(45) Date of Patent: Jun. 11, 2024

(54) PRECISION MANIFOLD FOR AN ION THRUSTER USING CHARACTERIZED FLOW RESTRICTORS

(71) Applicant: United States of America as represented by the Administrator of NASA, Washington, DC (US)

(72) Inventors: Timothy G. Gray, Cleveland, OH (US); Gabriel F. Benavides, Cleveland, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 569 days.

(21) Appl. No.: 16/799,079

(22) Filed: Feb. 24, 2020

Related U.S. Application Data (60) Provisional application No. 62/809,820, filed on Feb. 25, 2019.

(51) Int. Cl.
    *F03H 1/00* (2006.01)
    *B64G 1/40* (2006.01)

(52) U.S. Cl.
    CPC .......... *F03H 1/0012* (2013.01); *B64G 1/405* (2013.01); *F03H 1/0075* (2013.01)

(58) Field of Classification Search
    CPC .................................................. F03H 1/0012
    See application file for complete search history.

(56) References Cited

U.S. PATENT DOCUMENTS

| | | | |
|---|---|---|---|
| 6,075,321 A | 6/2000 | Hruby | |
| 6,301,876 B1* | 10/2001 | Back | F03H 1/0012 62/48.1 |
| 7,164,227 B2 | 1/2007 | de Grys | |
| 7,624,566 B1 | 12/2009 | Manzella et al. | |
| 10,283,944 B2 | 4/2019 | Huang et al. | |
| 2019/0168895 A1 | 6/2019 | Conversano et al. | |
| 2020/0325999 A1* | 10/2020 | Aklog | F15D 1/025 |
| 2021/0010463 A1* | 1/2021 | Kronhaus | F03H 1/0012 |

OTHER PUBLICATIONS

Gabriel F. Benavides et al., Development of a High-Propellant Throughput Small Spacecraft Electric Propulsion System to Enable Lower Cost NASA Science Missions, AIAA Propulsion and Energy 2019 Forum, Aug. 19-22, 2019, Indianapolis, IN, http://arc.aiaa.org | DOI: 10.2514/6.2019-4162.

\* cited by examiner

*Primary Examiner* — Arun Goyal
*Assistant Examiner* — William L Breazeal
(74) *Attorney, Agent, or Firm* — Robert H. Earp, III; Mark Wolfgang; Trenton J. Roche (57) ABSTRACT

Precision flow restrictors and techniques for manufacturing the same for ion thruster manifolds are disclosed. Flow restricting features are moved out of the manifold base and into separate flow restrictors, allowing a wider range of manufacturing techniques and materials to be applied. Quality control can be performed at the level of the flow restrictors as subcomponents, ensuring that only good parts with ideal flow characteristics make it into the final assembly and improving the yield rate of the final manifold assembly.

15 Claims, 8 Drawing Sheets

PRECISION MANIFOLD FOR AN ION THRUSTER USING CHARACTERIZED FLOW RESTRICTORS

CROSS-REFERENCE TO RELATED APPLICATION

This application claims the benefit of U.S. Provisional Patent Application No. 62/809,820 filed Feb. 25, 2019. The subject matter of this earlier filed application is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention generally pertains to space propulsion, and more particularly, to ion thruster propellant manifolds and techniques for manufacturing the same using characterized flow restrictors.

BACKGROUND

Flow restricting features in an ion thruster propellant manifold assembly, which are typically precision-manufactured orifices in a common plate, can contribute to significant flow non-uniformity if tolerances on the features are not properly controlled during manufacturing. Such non-uniformity in flow distribution negatively impacts thruster performance. Furthermore, the manifold assembly is typically complex and expensive to manufacture, and ensuring flow uniformity of the assembly is difficult and expensive to verify.

Figure 1:
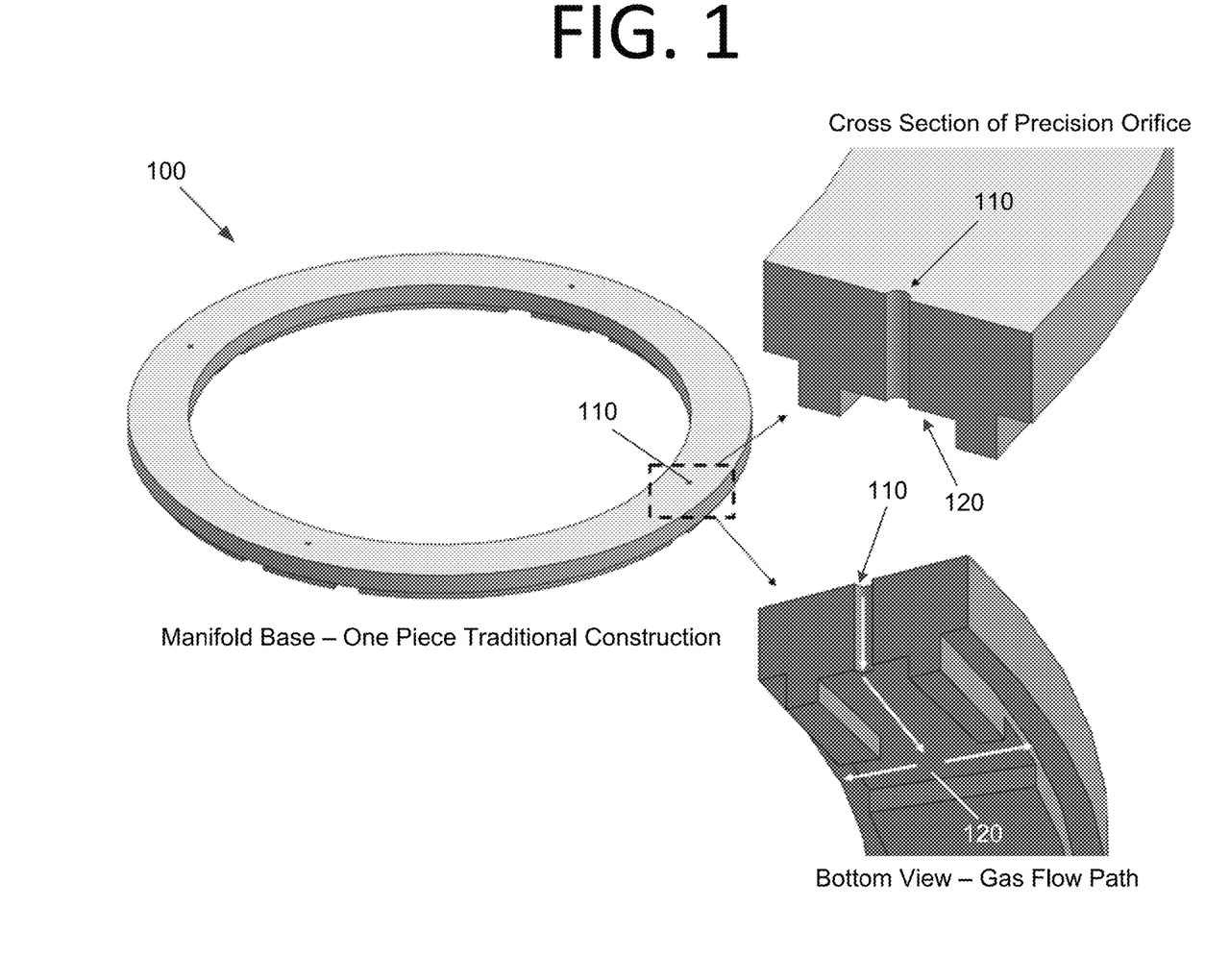
FIG. 1 illustrates a conventional manifold base.

In the specific case of a Hall-effect propellant manifold, current manufacturing techniques typically drill orifices in a manifold base, which is then embedded in an all-welded manifold assembly prior to testing. Such a conventional manifold base 100 is shown in FIG. 1. As seen in FIG. 1, manifold base 100 has precision machined orifices 110 drilled in a single solid piece. An example gas flow path is illustrated as well. Gas comes down orifices 110 and then gets distributed through channels 120.

Any defect with manufacturing any of the orifices can affect the performance of the overall gas delivery system, and ultimately, of the thruster. Thus, if a manifold assembly incorporating such a single piece manifold base is discovered to have a substandard flow uniformity during this testing late in assembly, the entire all-welded manifold assembly must usually be scrapped, and manufacturing must start anew, incurring substantial scheduling delays and costs. Discovering that a manifold assembly has substandard flow performance at the final assembly level is thus a consistent risk for fabrication cost and schedule overrun. Accordingly, an improved manifold assembly for ion thrusters may be beneficial.

SUMMARY

Certain embodiments of the present invention may be implemented and provide solutions to the problems and needs in the art that have not yet been fully solved by conventional space vehicle propulsion technologies. For example, some embodiments of the present invention pertain to characterized flow restrictors and techniques for manufacturing the same for ion thruster manifolds. As used herein, "characterized" flow restrictors are selected for certain flow restricting properties pertinent to the manifold.

In an embodiment, an apparatus includes a plurality of flow restricting elements configured to restrict flow of a propellant and a manifold base including a plurality of holes. The plurality of flow restricting elements are located in respective holes of the plurality of holes of the manifold base. The plurality of flow restricting elements are separate subcomponents from the manifold base.

In another embodiment, a manifold assembly for an ion thruster includes a plurality of flow restricting elements configured to restrict flow of a propellant and a manifold base including a plurality of holes. The plurality of flow restricting elements are located in respective holes of the plurality of holes of the manifold base. The manifold assembly also includes a propellant delivery tube including an end that enters the manifold base and is configured to deliver propellant thereto. The plurality of flow restricting elements are separate subcomponents from the manifold base. Gas-dynamic flow restriction characteristics of the plurality of flow restricting elements are based on a proximity of the respective flow restricting element to the end of the propellant delivery tube.

In yet another embodiment, a flow restricting element for a manifold assembly for an ion thruster includes at least one orifice or a sintered porous structure configured to restrict a flow of propellant through the flow restricting element. The flow restricting element is a separate subcomponent from the manifold base. The flow restricting element is configured to be inserted into a respective hole in the manifold base.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Some embodiments of the present invention pertain to precision flow restrictors and techniques for manufacturing the same for ion thruster manifolds. Indeed, some embodiments may be used for any type of ion thruster using a gaseous propellant and having a uniform or non-uniform propellant distribution without deviating from the scope of the invention. Such precision restrictors and techniques may provide a lower cost and more reliable approach to propellant manifolds for use in Hall-effect thrusters, for example. For instance, some embodiments may reduce the cost of acceptance testing. Also, the higher confidence in manifold manufacturing quality provided by some embodiments may eliminate the need for verification tests on flight hardware where the manifold is placed within the discharge chamber of the ion thruster in a vacuum test facility and pressure measurements are taken around the manifold in the vacuum to determine flow characteristics. The techniques of some embodiments may be applied to any type of ion propulsion device without deviating from the scope of the invention.

By removing the flow restricting elements from the propellant manifold structure and making them separate and insertable components, more reliable and repeatable precision manufacturing techniques can be applied. Furthermore, the resulting components can be tested, characterized, and sorted for acceptance before being installed into the larger manifold assembly. Poor performing parts can be discarded before installation. Performing quality control at the component level can lead to increased performance of the final assembly as well as improving yield rate of the more expensive final propellant manifold assembly.

Controlling the flow characteristics of the flow restricting features is typically done by using precision manufacturing techniques. By moving the flow restricting features out of the manifold base and into a separate subcomponent, a wider range of manufacturing techniques and materials can be applied. Additionally, quality control (e.g., testing, performance characterization, and rejection) can be performed on the subcomponent, ensuring that only good parts with ideal flow characteristics make it into the final assembly. This improves the yield rate of the final manifold assembly.

Figure 2:
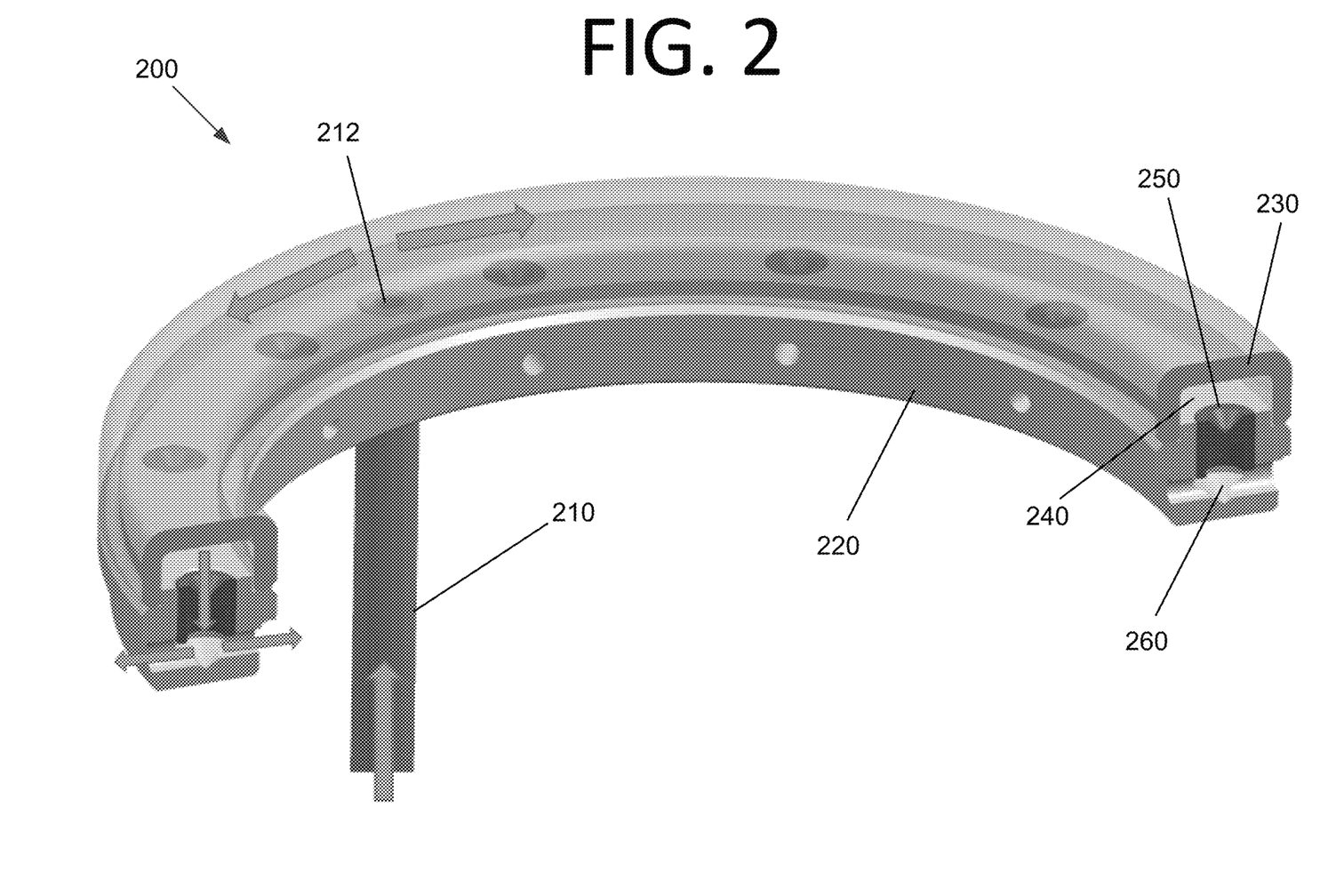
FIG. 2 is a partially transparent perspective cutaway view illustrating a manifold assembly for an ion thruster, according to an embodiment of the present invention.

FIG. 2 is a partially transparent perspective cutaway view illustrating a manifold assembly 200 for an ion thruster, according to an embodiment of the present invention. Propellant delivered to manifold assembly 200 in this embodiment occurs at one azimuthal location in the manifold ring—i.e., via a propellant delivery tube 210 having an end 212 that delivers propellant through a manifold base 220. However, in certain embodiments, multiple propellant delivery tubes may be used. The thicker gray arrows in FIG. 2 indicate the directions of propellant flow. A manifold cover 230 forms a plenum 240 together with manifold base 220. The propellant flows through orifice plugs 250 (also called "flow restrictors", "flow elements", "flow restricting elements", or "subcomponents" herein) and out of manifold assembly 200 via corresponding exit channels 260.

Figure 3:
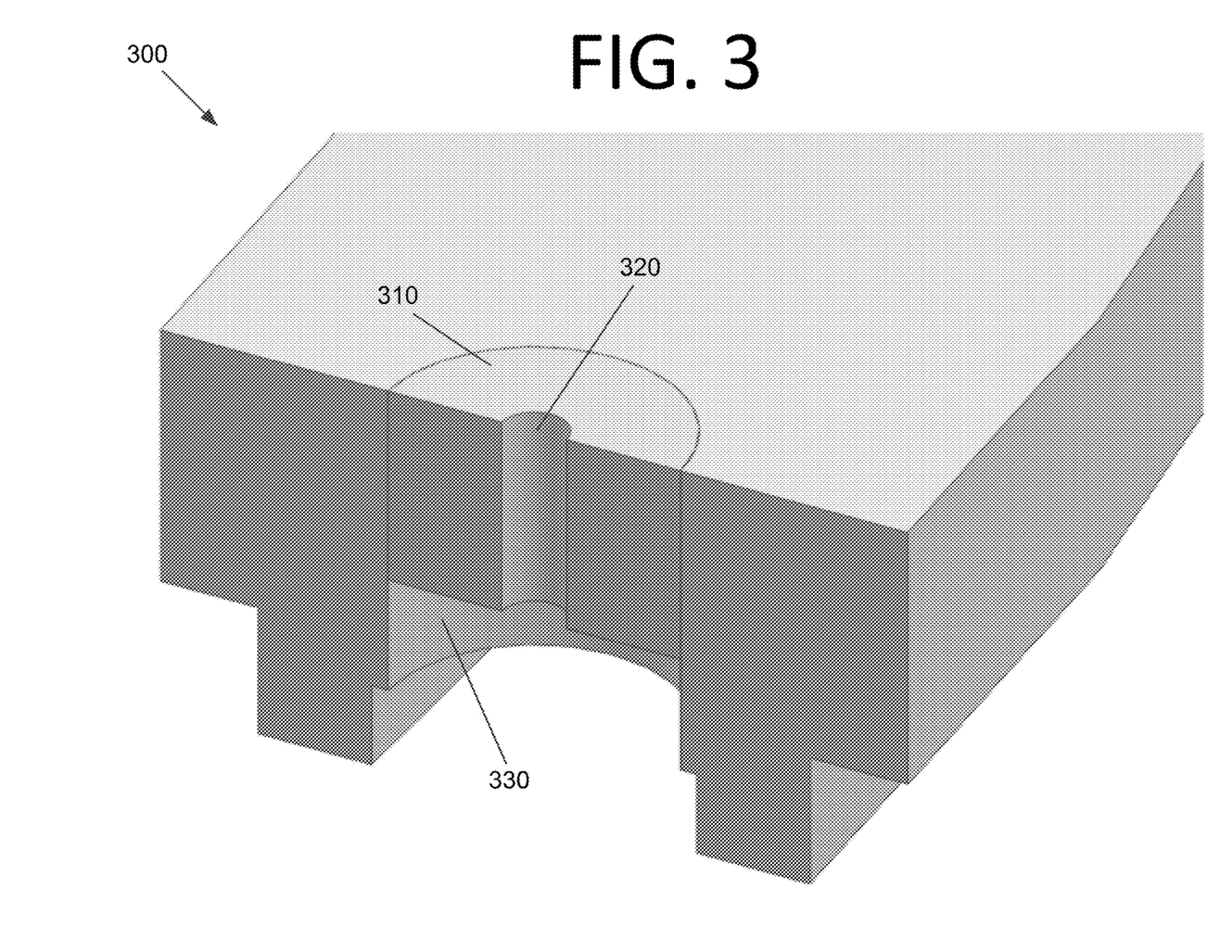
FIG. 3 is a perspective view illustrating a portion of a manifold base, according to an embodiment of the present invention.
Figure 4:
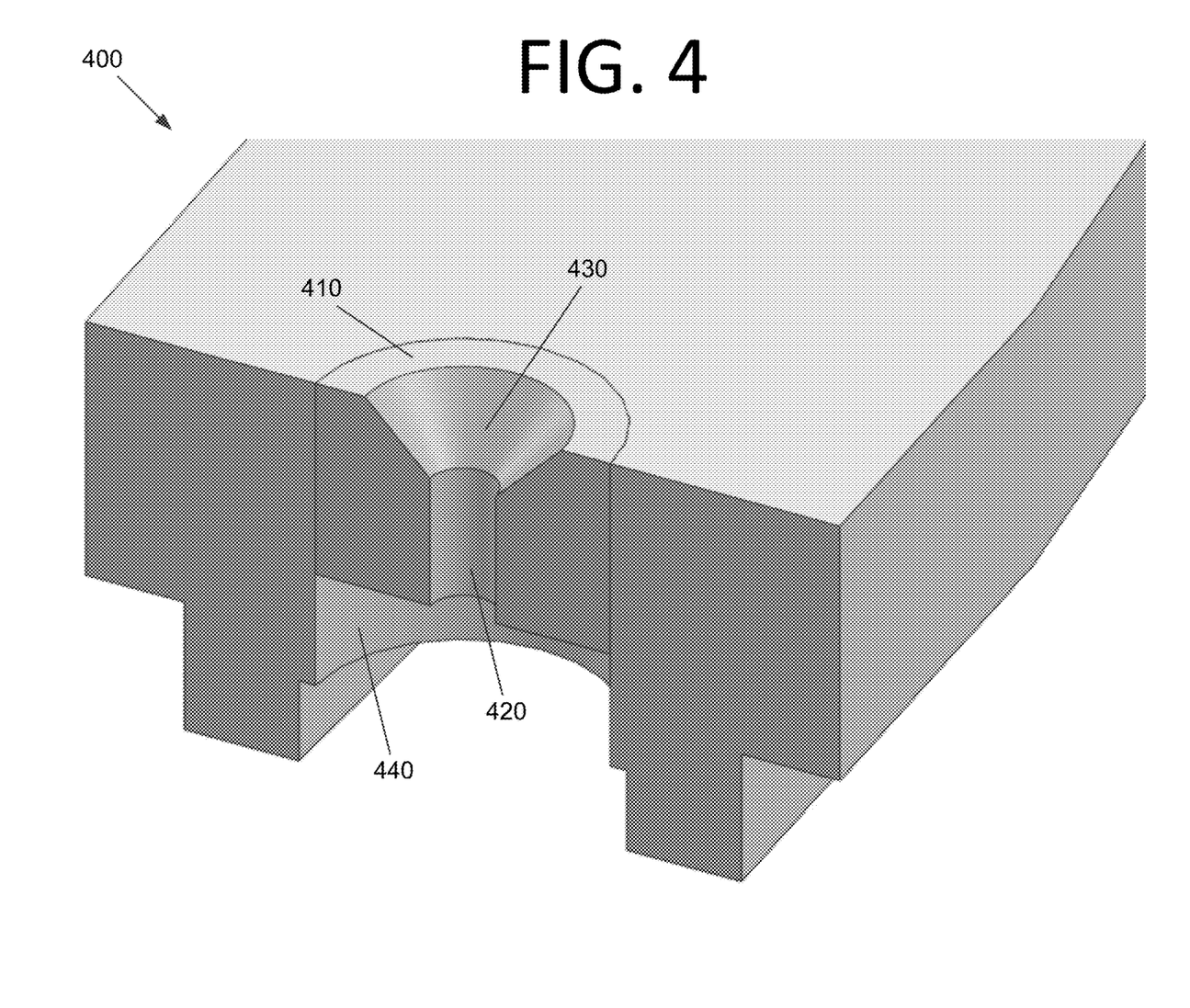
FIG. 4 is a perspective view illustrating a portion of a manifold base, according to an embodiment of the present invention.

In this embodiment, orifice plugs 250 are shown as having a converging section with a funnel-like shape, as shown in FIG. 4. However, any desired orifice shape(s), size(s), location(s) and/or number of orifices may be used without deviating from the scope of the invention. In certain embodiments, orifice plugs 250 are surrounded by a carrier (not shown) that helps to secure them in place. See, for example, FIGS. 5A and 5B. Indeed, any of the orifice plug designs shown in FIGS. 3-6 or combinations thereof may be used in manifold assembly 200 without deviating from the scope of the invention.

As the propellant delivered to manifold assembly 200 flows azimuthally around plenum 240, delivering propellant to each orifice plug 250, a drop in pressure occurs in plenum 240. Whereas all orifices in conventional propellant manifolds are manufactured to an identical specification, in some embodiments, orifice plugs may have flow characteristics designed for their position in manifold assembly 200. This may be to compensate for the fact that, assuming similar flow restricting characteristics, orifice plugs 250 closest to end 212 of propellant delivery tube 210, where the pressure in plenum 240 is the highest, would eject the highest mass flow of propellant, while orifice plugs 250 further from end 212 of propellant delivery tube 210, where the propellant pressure is lower, would eject decreasing amounts of propellant based on their distance from end 212. This effect can result in significant azimuthal flow nonuniformity in an ion thruster.

By characterizing precision orifices for their unique gas-dynamic properties, orifice plugs 250 at each location may be appropriately selected to counter the negative effect of the pressure drop in plenum 240. Orifice plugs 250 with a lower predisposition to gas flow can be installed closest to end 212 of propellant delivery tube 210, while orifice plugs 250 with a higher predisposition to propellant flow may be installed away from end 212 of propellant delivery tube 210. This may essentially cancel out the effect of pressure drop, where all orifice plugs 250 may deliver equal or near-equal flow rates (e.g., within a few percent). While attempting such an outcome with machined holes in a single plate would be challenging and expensive, doing so with characterized orifice plugs, as is done in some embodiments, is much more practical and cost effective. The resulting flow distribution in a propellant manifold fabricated using this approach can be applied not only to achieve uniform flow fields, but also to achieve non-uniform flow fields based on the implementation.

FIG. 3 is a perspective view illustrating a portion of a manifold base 300, according to an embodiment of the present invention. Manifold base 300 includes a flow element 310 (also called a "flow restrictor", "flow restricting element", or "subcomponent" herein) with an orifice 320. It should be appreciated that while one orifice is shown here, any number, size(s), shape(s), and/or orientation(s) of orifices may be used without deviating from the scope of the invention. In this embodiment, flow element 310 has a cylinder shape, but any suitable shape may be used without deviating from the scope of the invention (e.g., cube, truncated pyramid, truncated cone, irregular shapes, etc.). Orifice 320 may be precision machined in some embodiments. Flow element 310 may be press fit into a respective hole 330 (or plenum) drilled in manifold base 300, soldered or welded in place, etc. Additionally or alternatively, the outer surface of flow element 310 and an inner surface of hole 330 may be counter-threaded with respect to one another such that flow element 310 screws into hole 330.

In some embodiments, the orifice through which the propellant gas (e.g., xenon) flows may be non-cylindrical. Such an embodiment is shown in FIG. 4. Like FIG. 3, manifold base 400 includes a flow element 410 with an orifice 420. However, in FIG. 4, a converging section 430 is machined into flow element 410 and leads to orifice 420.

In certain embodiments, it may be desirable to make the flow element from a different material than the manifold base, such as from corundum (e.g., sapphire or ruby) or a ceramic. It is typically possible to achieve higher precision ceramic orifices than with a metal or alloy. For instance, high precision techniques used for watch making or water jets may be employed to create precise orifices in sapphire. Sapphire orifices are used in water jet nozzles. Likewise, watch movements sometimes use sapphire movements. This means that there is a preexisting manufacturing base that can make these parts to tight tolerances and for a reasonable price. As such, these components can be made at a low cost and can achieve tolerances on the order of ten thousandths of an inch.

However, such materials may not be amenable to press fitting or being secured in a hole machined in the manifold base by themselves. For instance, sapphire cannot be welded into an Inconel® manifold. In such embodiments, a different carrier material, such as an austenitic nickel-chromium-based superalloy with a low coefficient of thermal expansion (e.g., Kovar®, Invar®, etc.) or another metal alloy, may be used to secure the flow element in the manifold base. In certain embodiments, the carrier material may be the same material as the manifold base. Such an embodiment is shown in FIG. 5A.

Unlike manifold bases 300, 400 of FIGS. 3 and 4, respectively, manifold base 500 includes a flow element 520 that is a laminar flow element with relatively small precision orifices 530. In certain embodiments, flow element 520 may be constructed from a sintered porous material. Flow element 520 is located within a carrier 510 that allows flow element 520 to be secured within hole 540 of anode base 500.

Figure 5A:
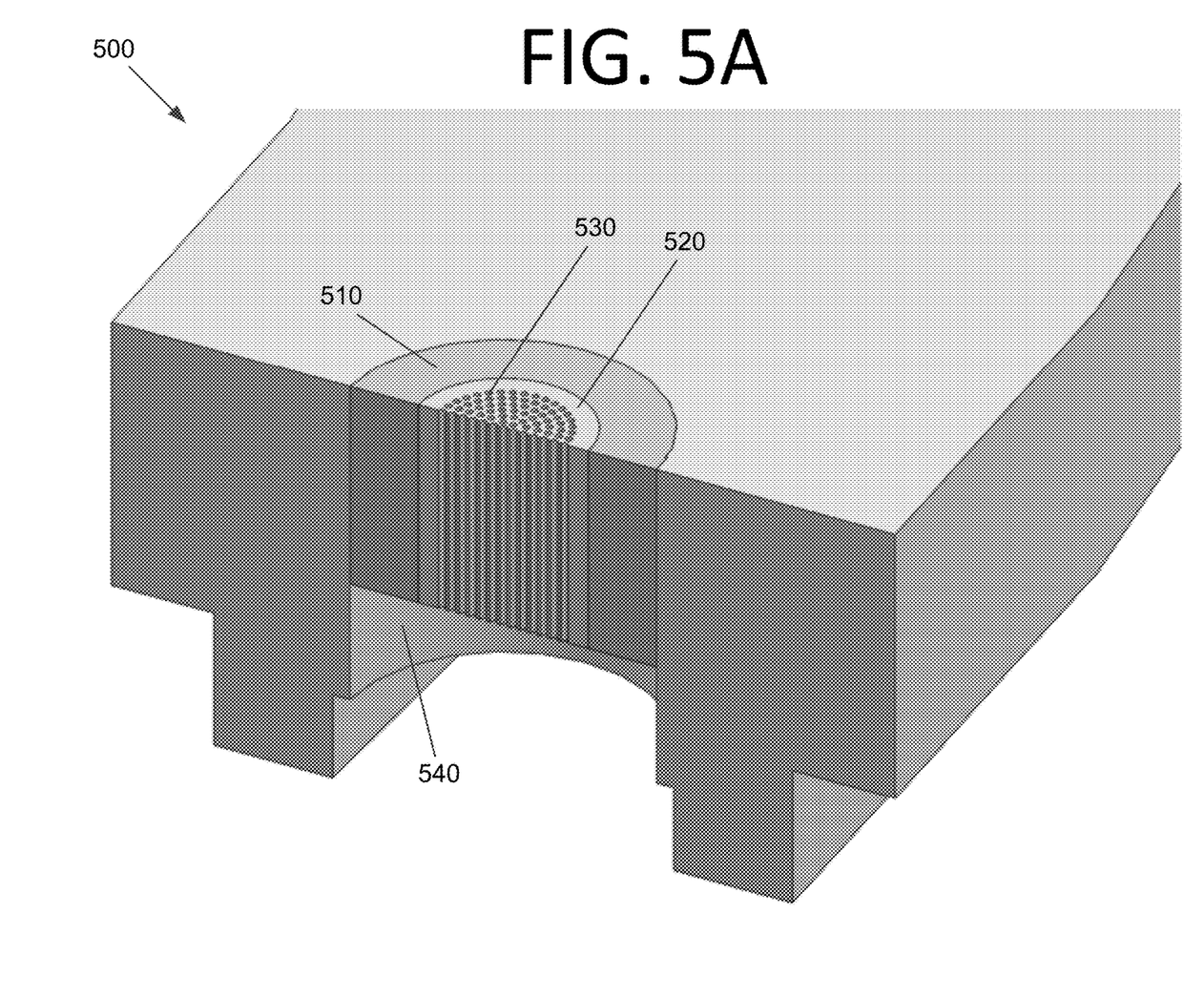
FIG. 5A is a perspective view illustrating a portion of a manifold base, according to an embodiment of the present invention.
Figure 5B:
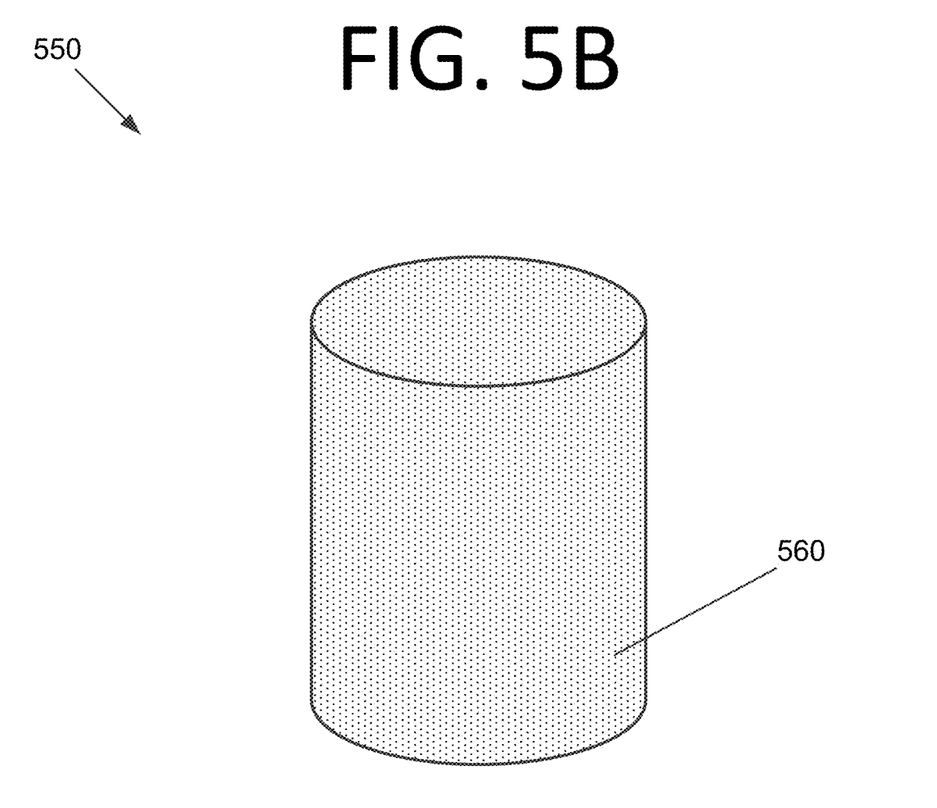
FIG. 5B illustrates a flow element made from a sintered porous material, according to an embodiment of the present invention.

Some embodiments use a sintered porous material flow element in place of flow element 520 of FIG. 5A. Such a flow element 550 is shown in FIG. 5B. Flow element 550 has small pores 560 formed in the sintered porous material (e.g., stainless steel, titanium, alloys such as Hastelloy® or Inconel®, etc.) that increase the surface area of flow element 550 (i.e., a restricting element) such that pores 560 of flow element 550 are less prone to clogging than precision orifices 530 of flow element 520. As with flow elements 310, 410, carrier 510 may be press fit, screwed, welded, soldered, etc. to secure carrier 510 and flow element 520 or 550 in hole 540 of manifold base 500. Regardless of the technique(s) used to install and secure flow elements within respective holes of the manifold base, hermetic seals should be created. A press fit relying on plastic deformation of flow element 520 or 550, carrier 510, or manifold base 500 to provide a hermetic seal is one option. Another is to tap manifold base 500 and machine threads on carrier 510, enabling one to thread carrier 510 with flow element 520 or 550 therein into manifold base 500. Yet another option is sealing carrier 510 by brazing or crimping. Carrier 510 could then be laser welded on the top surface of manifold base 500 to provide a robust hermetic seal. However, in certain embodiments, flow elements may be extracted and replaced after initial insertion.

A unique feature of some embodiments is the ability to use materials that are not traditionally used in ion thruster manifolds. Since the manifold base is conventionally one piece, the material in conventional manifold bases must be uniform. However, by breaking the manifold base into multiple components, different materials from those of the manifold base could be used for the flow elements of some embodiments. Broader material selection opportunities could allow the use of alternative manufacturing techniques to achieve the desired flow control performance. Additionally, access to additional techniques of quality control, potentially more accurate and used earlier in the process, could boost final yield rate numbers for manifold assemblies.

Some embodiments allow a statistical distribution of flow elements to be fabricated with less stringent tolerances than if machined in a single plate. Flow elements could be pre-screened for their flow performance characteristics, sorted, and binned with flow elements having similar characteristics. While each manifold assembly that is manufactured typically requires some number of flow restricting elements with sufficiently similar (or appropriately dissimilar) flow characteristics to achieve uniform or non-uniform flow distribution for a given application, each manifold assembly does not need to have flow restricting elements with the exact same characteristics as another manifold assembly. Thus, sorting the flow elements can be used to reduce manufacturing tolerances rather than actually reducing manufacturing variance, which is typically far more expensive.

Rather than using a highly specialized and advanced vacuum chamber used for ion thruster acceptance testing that requires thousands of dollars of testing time, flow elements may be tested using a less complex, less expensive, and more widely available device. For instance, flow elements could be placed into a flow testing device that includes a few valves, a couple of pressure sensors, a vacuum pump, and a propellant source. By passing a known flow of propellant through a flow restricting element, where the pressure drop across the device is held consistent with the intended application, and measuring the pressure upstream and downstream of the device, the predisposition of the flow restricting element to pass propellant can be characterized. One technique to characterize the orifice is determining Cd*A, where Cd is the discharge coefficient and A is the orifice area. The flow devices may also be characterized for a range of Reynolds numbers by varying the propellant mass flow, propellant temperature, or the type of propellant. Flow elements may then be binned based on the results of this testing.

A mass flow controller that regulates and measures the propellant flow may be used to make such measurements. The output of the mass flow controller goes past a pressure sensor, through the flow restrictor element, then past another pressure sensor, and finally, the propellant is transported away by a pump. The pump maintains a pressure drop across the orifice sufficient to ensure a choked flow condition.

In certain embodiments, orifice sizes, pore sizes, or other flow restriction characteristics may be selected based on distance from locations where propellant is fed into the manifold, per the above. For instance, a flow element that is closer to a gas feed tube would experience a higher gas pressure and may have smaller orifices or pores, whereas a flow element that is further from a gas feed tube would experience a lower gas pressure due to pressure drop in the channel and may thus have larger orifices or pores to ensure that it has a similar gas throughput to other flow elements, regardless of their distance from the gas supplies. This approach could also be applied to a large single piece manifold base where holes are drilled.

In the case of a sintered porous materials, the pores may be 10 thousandths of an inch, 15 thousandths of an inch, 20 thousandths of an inch, etc. If manufacturing variability is $\frac{1}{1000}^{th}$ of an inch, this creates substantial variability in percentage. Thus, binning flow elements with similar flow characteristics may provide a mechanism for achieving desired performance characteristics without reducing manufacturing variability, which may be expensive.

Certain manufacturing techniques are suitable for manufacturing small cylindrical objects that are not suitable for creating monolithic manifold bases. For instance, precision grinding, sintering of porous material, and/or laser drilling may be used.

In some embodiments, stacked flow restrictor devices may be used, where multiple flow restricting elements are stacked on top of one another. To create a compact restriction, thin plates with channels may be stacked or other configurations may be used to create complex flow paths that result in the desired flow restriction characteristics.

Figure 6:
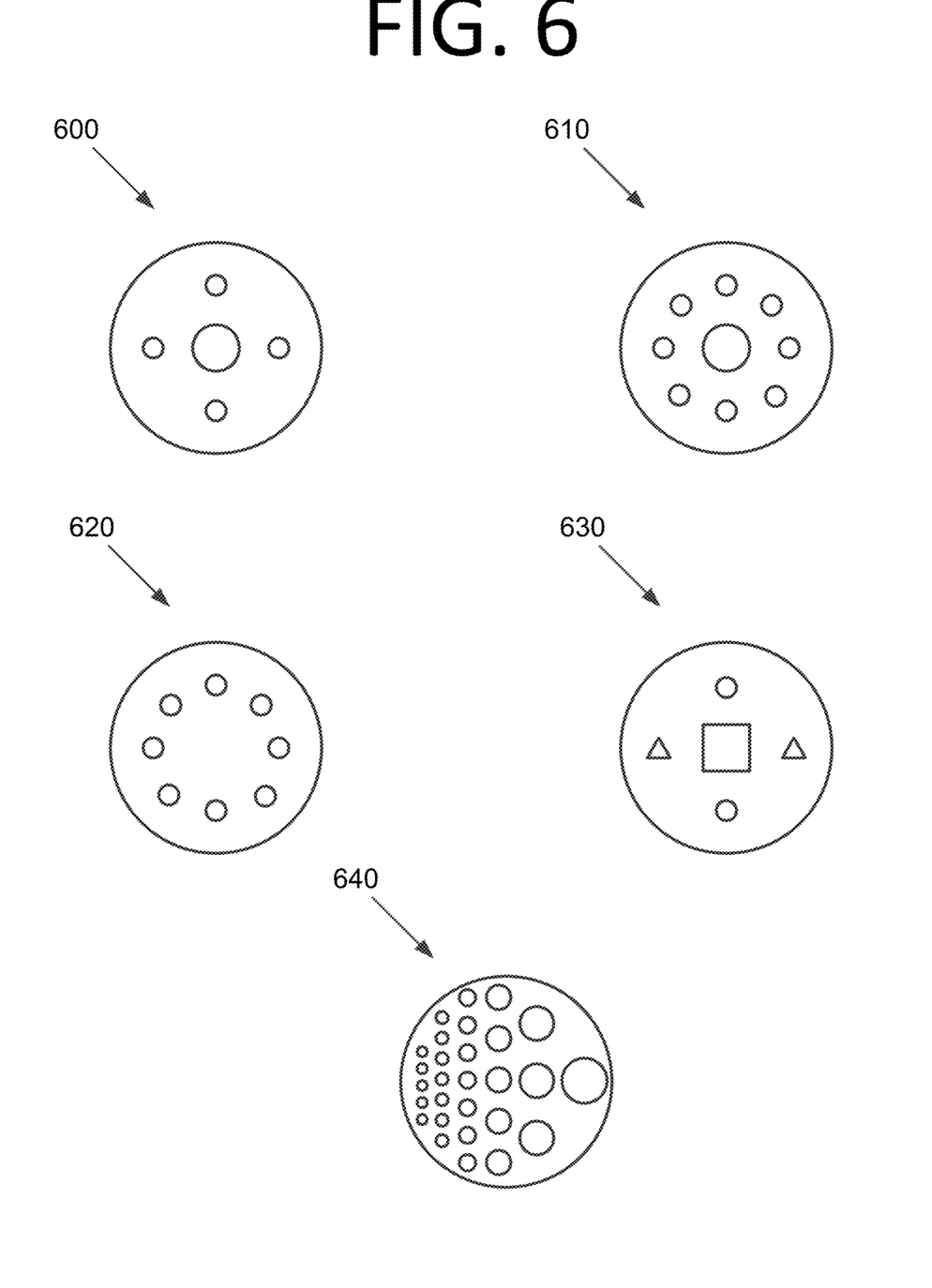
FIG. 6 illustrates some example orifice configurations in a flow element, according to an embodiment of the present invention.

Per the above, flow elements may include any number, size(s), shape(s), and/or orientation(s) of orifices without deviating from the scope of the invention. Additionally or alternatively, the flow elements may be made from a sintered and/or porous material with or without additional orifices therein. Some example flow element configurations 600, 610, 620, 630, 640 are shown in FIG. 6. For instance, flow elements may have a central orifice that is larger than peripheral orifices (e.g., 600, 610, 630), have different shapes (e.g., 630), be configured in a ring (e.g., 620), increase in size in a direction further from a gas supply (e.g., 640), etc. It should be noted that orifice sizes may not be to scale.

Figure 7:
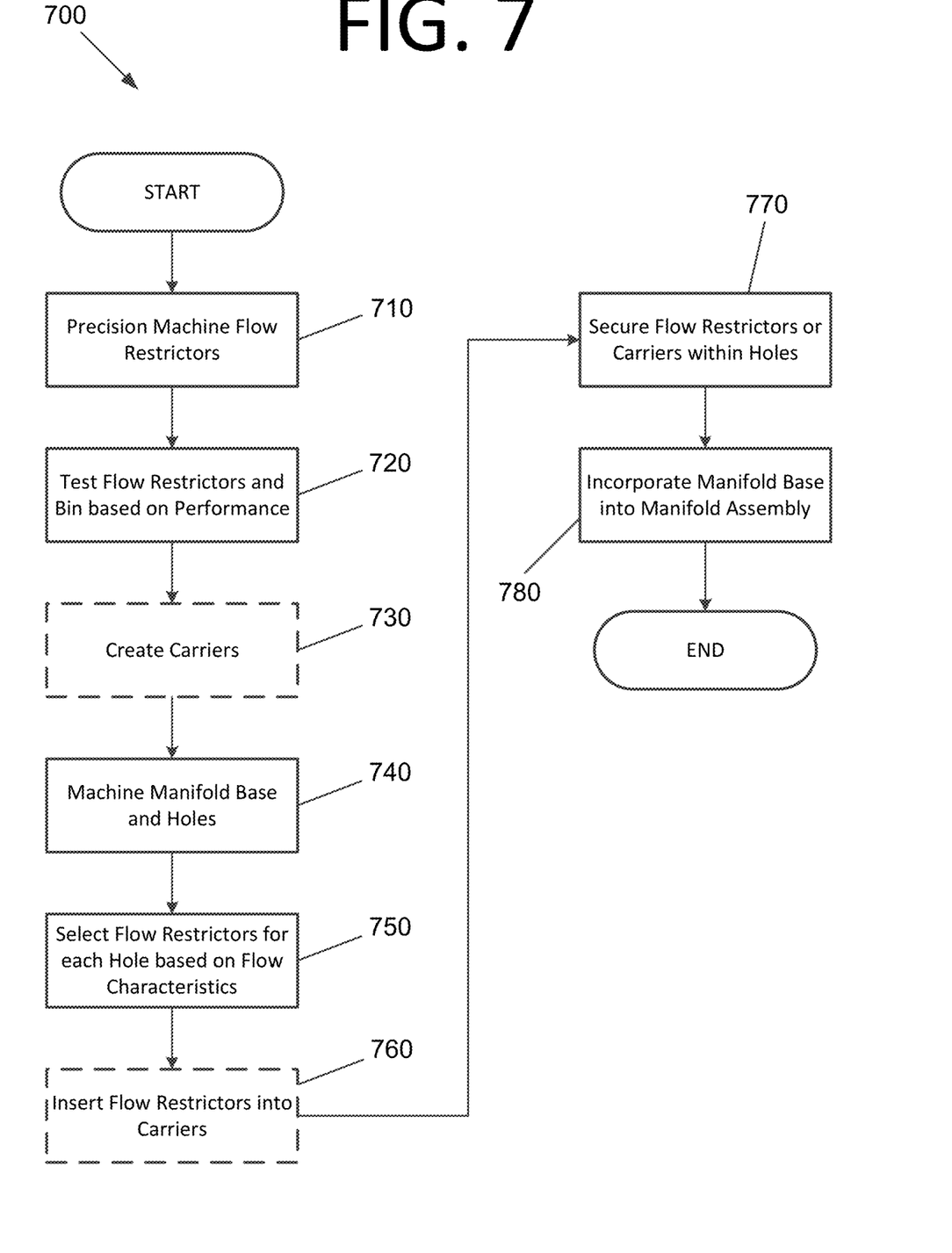
FIG. 7 is a flowchart illustrating a process for manufacturing, testing, and installing precision flow restrictors for ion thruster manifolds, according to an embodiment of the present invention.

FIG. 7 is a flowchart illustrating a process 700 for manufacturing, testing, and installing precision flow restrictors for ion thruster manifolds, according to an embodiment of the present invention. The process begins with precision manufacturing multiple flow restrictors at 710. The precision machining may include, but is not limited to, precision grinding, sintering of porous material, laser drilling, any combination thereof, etc. The precision machining may also include machining orifices in the flow restrictors with desired sizes, shapes, locations, and/or orientations.

The flow restrictors are then tested to determine their flow characteristics and binned based on performance at 720. Flow restrictors may be sorted and binned based on pore sizes, machined orifice sizes, flow restriction qualities, etc. In embodiments where carriers are used in the manifold base, the carriers are created at 730. In some embodiments, the carriers are the same material as the manifold base.

The manifold base and holes therein for the flow restrictors are machined at 740. This may be performed before, after, or during machining of the flow restrictors. Flow restrictors are selected for insertion into the respective manifold holes at 750. For instance, flow restrictors closer to a gas plenum providing gas to the manifold base may restrict gas flow more than flow restrictors that are further from the gas plenum.

In embodiments using carriers, the flow restrictors are inserted into their respective carriers at 760. The flow restrictors or carriers housing flow restrictors are then secured into the holes at 770. This may be accomplished by press fitting, screwing in, brazing, crimping, welding, soldering, etc. The manifold base is then incorporated into the manifold assembly at 780.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a plurality of flow restricting elements configured to restrict a flow of a propellant; and
   a manifold base comprising a plurality of holes, each flow restricting element of the plurality of flow restricting elements located in a respective hole of the plurality of holes, wherein the plurality of flow restricting elements are separate subcomponents from the manifold base; and
   a propellant delivery tube comprising an end that enters the manifold base and is configured to deliver the propellant thereto, wherein
   a gas-dynamic flow restriction characteristic of each flow restricting element of the plurality of flow restricting elements is based on a proximity of the respective flow restricting element of the plurality of flow restricting elements to the end.

2. The apparatus of claim 1, wherein the gas-dynamic flow restriction characteristic of each flow restricting element the plurality of flow restricting elements is decreased depending on a respective distance from the end to accommodate for a pressure drop in the propellant at the respective flow restricting element of the plurality of flow restricting elements.

3. The apparatus of claim 1, wherein each flow restricting element of the plurality of flow restricting elements are is configured to provide the same uniform propellant flow rate regardless of the respective distance from the end.

4. The apparatus of claim 1, further comprising:
a manifold cover that forms a plenum with the manifold base, the plenum configured to distribute the flow of propellant to the plurality of flow restricting elements; and
a plurality of respective exit channels for each flow restricting element of the plurality of flow restricting elements, each of the plurality of respective exit channels configured to channel a respective flow of the propellant out of the apparatus.

5. The apparatus of claim 1, further comprising:
at least one carrier for at least one flow restricting element of the plurality of flow restricting elements, the at least one carrier configured to secure the at least one flow flow restricting element of the plurality of flow restricting elements in the respective hole of the manifold base.

6. The apparatus of claim 5, wherein the at least one carrier and the at least one flow restricting element comprise a different material.

7. The apparatus of claim 6, wherein the at least one carrier comprises corundum or a ceramic.

8. The apparatus of claim 5, wherein the at least one carrier and the manifold base comprise a same material.

9. The apparatus of claim 1, wherein at least one flow restricting element of the plurality of flow restricting elements comprises a single orifice.

10. The apparatus of claim 9, wherein the single orifice comprises a converging section.

11. The apparatus of claim 1, wherein at least one flow restricting element of the plurality of flow restricting elements comprises a sintered porous material.

12. The apparatus of claim 1, wherein at least one flow restricting element of the plurality of flow restricting elements comprises a plurality of orifices.

13. A manifold assembly for an ion thruster, comprising:
a plurality of flow restricting elements configured to restrict a flow of a propellant;
a manifold base comprising a plurality of holes, each flow restricting element of the plurality of flow restricting elements located in a respective hole of the plurality of holes; and
a propellant delivery tube comprising an end that enters the manifold base and is configured to deliver the propellant thereto, wherein
the plurality of flow restricting elements are separate subcomponents from the manifold base, and
a gas-dynamic flow restriction characteristic of each flow restricting element of the plurality of flow restricting elements is based on a proximity of the respective flow restricting element of the plurality of flow restricting elements to the end.

14. The manifold assembly of claim 13, wherein
wherein the gas-dynamic flow restriction characteristic of each flow restricting element the plurality of flow restricting elements is decreased depending on a respective distance from the end to accommodate for a pressure drop in the propellant at the respective flow restricting element of the plurality of flow restricting elements, and
each flow restricting element of the plurality of flow restricting elements is configured to provide the same uniform propellant flow rate regardless of the respective distance from the end.

15. The manifold assembly of claim 13, further comprising:
at least one carrier for at least one flow restricting element of the plurality of flow restricting elements, the at least one carrier configured to secure the at least one flow flow restricting element of the plurality of flow restricting elements in the respective hole of the manifold base, wherein
the at least one carrier and the at least one flow restricting element comprise a different material.

* * * * *